United States Patent Office 3,076,823
Patented Feb. 5, 1963

3,076,823
PROCESS FOR THE PRODUCTION OF 6-CHLORO-3-KETO-$\Delta^{4,6}$ STEROID COMPOUNDS
Howard J. Ringold, Shrewsbury, Mass., and Francisco Alvarez and James C. Orr, Mexico City, Mexico, assignors, by mesne assignments, to Syntex Corporation, a corporation of Panama
No Drawing. Filed July 3, 1961, Ser. No. 121,331
10 Claims. (Cl. 260—397.4)

The present invention relates to a novel process for the production of cyclopentanophenanthrene compounds.

More particularly the present invention relates to a process for the production of 6-chloro-3-keto-$\Delta^{4,6}$ steroid compounds especially of the pregnane and androstane series. Compounds of the character set forth are valuable therapeutic agents. Thus 17$\alpha$-acetoxy-6-chloro-$\Delta^{4,6}$-pregnadiene-3,20-dione is an extremely valuable progestational agent, 6-chloro-6-dehydrocortisone is a valuable anti-inflammatory agent etc. In general, however, the methods for the introduction of the 6-chloro group have been complicated and have resulted in relatively low yields.

In accordance with the present invention the surprising discovery has been made that when a $\Delta^{4,6}$-3-keto steroid is reacted with chromyl chloride, there is a selective reaction with the $\Delta^6$-double bond to produce the corresponding 6-chloro-7-hydroxy-3-keto-steroid. Dehydration of this last mentioned compound with strong acid then gave the desired 6-chloro-3-keto-$\Delta^{4,6}$-steroid in high yield.

The novel process of the present invention is therefore exemplified by the following equation:

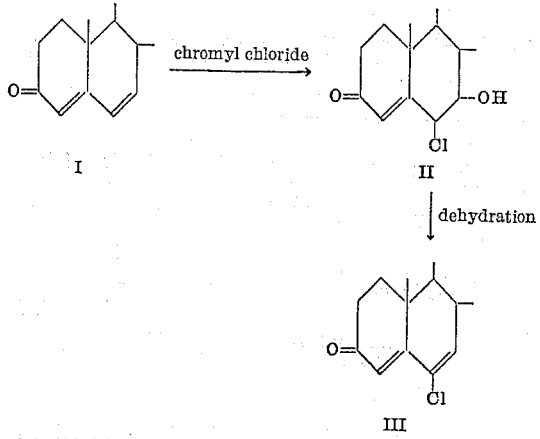

Referring to the above equation, a 3-keto-$\Delta^{4,6}$-steroid preferably of the pregnene or androstene series (I) is reacted with chromyl chloride to give the corresponding 6$\beta$-chloro-7$\alpha$-hydroxy-3-keto-$\Delta^4$-steroid (II). Typical steroid starting materials include $\Delta^{4,6}$-androstadien-17$\beta$-ol-3-one (6-dehydro-testosterone), $\Delta^{4,6}$-androstadien-3,17-dione (6-dehydro-androstendione), $\Delta^{4,6}$-pregnadiene-3,20-dione (6-dehydro-progesterone). The 17-acetate of $\Delta^{4,6}$-pregnadiene-17$\alpha$-ol-3,20-dione (6-dehydro - 17$\alpha$-acetoxy-progesterone) 6-dehydro-cortisone, 6-dehydro Reichstein's S etc. The last two compounds mentioned may be used in the form of their known bismethylenedioxy derivatives or 21-esters in order to prevent side reactions with the side chain and provide higher yields.

For the first step of the reaction preferably the steroid and reagent are dissolved in an inert organic solvent such as glacial acetic acid, chloroform, carbon tetrachloride, benzene, methylene dichloride, tetrahydrofuran etc. The temperature of the reaction is not especially critical and may vary from the freezing point to the boiling point of the solvent used. In general, however, for highest yields temperatures between $-10°$ C. and $+10°$ C. are desirable. The time of reaction may also be widely varied as for example from 15 minutes to 24 hours. The shorter time of reaction is, as may be understood, best used with higher reaction temperatures and longer times with lower temperatures. Preferably a reaction time of 1 to 5 hours at a temperature of from $-10°$ C. to $10°$ C. is used. The chromyl chloride is preferably used in molar excess, that is, in an amount 1.5 times to 10 times the starting steroid. About 2 to 5 mols for each mol of steroid is an especially desirable amount.

The second step may be practised with or without the isolation of the intermediate 6$\beta$-chloro-7$\alpha$-hydroxy compound. Thus the reaction mixture of the first step may be treated directly with acid to give a reaction mixture containing the 6-chloro-3-keto-$\Delta^{4,6}$-steroid which may then be poured into water and the 6-chloro-3-keto-$\Delta^{4,6}$-compound extracted and purified. Secondly, the reaction mixture of the first step may be poured into water, extracted with an organic solvent and the solvent solution used for the second step reaction. Thirdly, the product of the first step may be completely isolated and then redissolved in an organic solvent and dehydrated with acid.

Suitable organic solvents may be used for the second dehydration step including acetic acid, chloroform, methylene dichloride, ethyl acetate, acetone, etc. Mineral acids or strong organic acids are preferred for the dehydration; typical acids are p-toluenesulfonic acid, hydrochloric acid, hydrobromic acid, sulfuric acid, etc. Best results were obtained by the use of hydrochloric or hydrobromic acid in chloroform. These last acids could be used in either concentrated aqueous form or by passing hydrogen chloride or hydrogen bromide into the steroid solution. The quantity of acid used and the temperature and/or time of reaction is not critical. Preferably room temperature or above up to the boiling point of the solvent is used for a period of time of from 30 minutes to three hours. However, reflux temperature may be used. Where gaseous HCl or HBr is used the solution is saturated therewith. Where concentrated hydrochloric or hydrobromic acid is used, sufficient acid is used to bring the pH of the reaction solution substantially below neutrality i.e. to a pH below 3.5.

The following specific examples serve to illustrate but are not intended to limit the present invention:

Example I 3 g. of 6-dehydro-17$\alpha$-acetoxy-progesterone in 200 ml. of chloroform was cooled to 0° C. A solution of 5 molar equivalents of chromyl chloride in 27 cc. of chloroform was added in one batch, the mixture shaken and left at 0° C. for 3 hours. Then it was poured into one liter of water and extracted with ether. The extract was washed successively with water, sodium bisulfite solution, and water. Evaporation to dryness and crystallization of the residue from ethyl acetate yielded 6$\beta$-chloro-7$\alpha$-hydroxy-17$\alpha$ - acetoxy - progesterone with a melting point of 133–5° C.; $[\alpha]_D$ +2° (CHCl$_3$); $\lambda$ max. 241 m$\mu$, log $\epsilon$=2.85. Yield: 78%.

Example II 2 g. of the foregoing chlorohydrin were added to a mixture of 50 cc. of acetic acid and 5 cc. of concentrated hydrochloric acid whih had previously been brought to a temperature of 70° C. One hour after the addition of the steroid, the solution was poured into water and extracted with ethyl acetate. The organic extract was washed with water, and evaporated to dryness. Crystallization from ethanol afforded 6-chloro-6-dehydro-17$\alpha$-acetoxy-progesterone.

This compound has a melting point of 210°–12° C; $[\alpha]_D$ —2° (CHCl₃); λ max.=284 mμ, log ε=4.34. Yield; 85%.

*Example III*

3 g. of 6-dehydro-17α-acetoxy-progesterone in 200 ml. of chloroform was cooled to 0° C. A solution of 5 molar equivalents of chromyl chloride in 27 cc. of chloroform was added in one lot, the mixture shaken and left at 0° C. for 3 hours. Then the reaction mixture was added while stirring to a mixture of 50 cc. of acetic acid and 5 cc. of concentrated hydrochloric acid and heated to a temperature of 70° C. One hour after the addition, the mixture was poured into water and extracted with ethyl acetate. The organic extract was washed with water, and evaporated to dryness. Crystallization from ethanol afforded 6-chloro-6-dehydro-17α-acetoxy-progesterone.

*Example IV*

3 g. of 6-dehydro-17α-acetoxy-progesterone in 200 ml. of chloroform was cooled to 0° C. A solution of 5 molar equivalents of chromyl chloride in 27 cc. of chloroform was added in one lot, the mixture shaken and left at 0° C. for 3 hours. Then it was poured into one liter of water, and extracted with ether. The extract was washed successively with water, sodium bisulfite solution, and water. The dried extract was added with stirring to a mixture of 50 cc. of acetic acid and 5 cc. of concentrated hydrochloric acid which had previously been brought to a temperature of 70° C. One hour after the addition of the extract, the mixture was poured into water and extracted with ethyl acetate. The organic extract was washed with water, and evaporated to dryness. Crystallization from ethanol afforded 6-chloro-6-dehydro-17α-acetoxy-progesterone.

*Example V*

3 g. of 6-dehydro-17α-acetoxy-progesterone in 200 ml. of chloroform was cooled to —10° C. A solution of 5 molar equivalents of chromyl chloride in 27 cc. of chloroform was added in one portion, the mixture shaken and left at —10° C. for 5 hours. Then it was poured into 1 liter of water, and extracted with ether. The extract was washed successively with water, sodium bisulfite solution, and water. Evaporation to dryness and crystallization of the residue from ethyl acetate yielded 6β-chloro-7α-acetoxy-proesterone. Yield 75%.

*Example VI*

3 g. of 6-dehydro-17α-acetoxy-progesterone in 200 ml. of chloroform was cooled to 10° C. A solution of 5 molar equivalents of chromyl chloride in 27 cc. of chloroform was added in one batch, the mixture shaken and left at 10° C. for 2½ hours. Then it was poured into one liter of water, and extracted with ether. The extract was washed successively with water, sodium bisulfite solution, and water. Evaporation to dryness and crystallization of the residue from ethyl acetate yielded 6β-chloro-7α-hydroxy-17α-acetoxy proesterone. Yield 76%.

*Example VII*

2 g. of the chlorohydrin obtained according to Example I, were added to a mixture of 50 cc. of acetic acid and 5 cc. of 47% hydrobromic acid which had previously been brouht to a temperature of 70° C. One hour after the addition of the steroid, the solution was poured into water, and extracted with ethyl acetate. The organic extract was washed with water, and evaporated to dryness. Crystallization from ethanol afforded 6-chloro-6-dehydro-17α-acetoxy progesterone.

*Example VIII*

2 g. of the chlorohydrin obtained in accordance with Example I, were added to a mixture of 50 cc. of acetic acid and 5 cc. of concentrated sulfuric acid which had previously been brought to a temperature of 70° C. One hour after the addition of the steroid, the solution was poured into water and extrated with ethyl acetate. The organic extract was washed with water, and evaporated to dryness. Crystallization from ethanol afforded 6-chloro-6-dehydro-17α-acetoxy-progesterone.

*Example IX*

2 g. of 6β-chloro-7α-hydroxy17α-acetoxy-progesterone, obtained according to Example I, were dissolved in 100 cc. of chloroform and a slow stream of hydrogen chloride gas was passed through the solution for 5 hours. The reaction mixture was then poured into water, the organic layer washed until neutral, dried over anhydrous sodium sulfate and evaporated to dryness. Crystallization of the residue from ethyl acetate afforded 6-chloro-6-dehydro-acetoxy-progesterone.

*Example X*

Following the procedure described in Example I, there were treated the starting materials listed below, affording the corresponding indicated intermediates which upon treatment in accordance with Example II, afforded the respective products hereinafter set forth.

| Starting compound | Intermediate | Product |
|---|---|---|
| $\Delta^{4,6}$-androstadien-17β-ol-3-one. | 6β-chloro-$\Delta^4$-androstene-7α,17β-diol-3-one. | 6-chloro-$\Delta^{4,6}$-androstadien-17β-ol-3-one. |
| $\Delta^{4,6}$-androstadiene-3,17-dione. | 6β-chloro-$\Delta^4$-androsten-7α-ol-3,17-dione. | 6-chloro-$\Delta^{4,6}$-androstadiene-3,17-dione. |
| $\Delta^{4,6}$-pregnadiene-3,20-dione. | 6β-chloro-$\Delta^4$-pregnen-7α-ol-3,20-dione. | 6-chloro-$\Delta^{4,6}$-pregnadiene-3,20-dione. |
| $\Delta^{4,6}$-pregnadien-17α-ol-3,20-dione-17-acetate. | 6β-chloro-$\Delta^4$-pregnene-7α,17α-diol-3,20-dione-17-acetate. | 6-chloro-$\Delta^{4,6}$-pregnadien-17α-ol-3,20-dione-17-acetate. |
| 17,20;20,21-bismethylenedioxy-6-dehydrocortisone. | 17,20;20,21-bismethylenedioxy-6-chloro-7α-hydroxy-cortisone. | 17,20;20,21-bismethylenedioxy-6-chloro-6-dehydro-cortisone. |
| 17,20;20,21-bismethylenedioxy-6-dehydro-Reichstein's S. | 17,20;20,21-bismethylenedioxy-6β-chloro-7α-hydroxy Reichstein's S. | 17,20;20,21-bismethylenedioxy-6-chloro-6-dehydro-Reichstein's S. |

We claim:
1. A process for the production of 6-chloro-3-keto-$\Delta^{4,6}$-steroids selected from the group consisting of the androstane and pregnane series comprising reacting the corresponding 3-keto-$\Delta^{4,6}$-steroid with chromyl chloride and thereafter dehydrating the thus formed 6β-chloro-7α-hydroxy-3-keto-$\Delta^4$-steroid with a strong acid.

2. In a process for the production of 6-chloro-3-keto-$\Delta^{4,6}$-steroids selected from the group consisting of the androstane and pregnane series the step comprising reacting the corresponding 3-keto-$\Delta^{4,6}$-steroid with chromyl chloride.

3. The process of claim 2 wherein the reaction is conducted in an inert solvent at a temperature range from —10° C. to 10° C.

4. The process of claim 2 wherein the reaction is conducted in an inert solvent at a temperature range from —10° C. to 10° C.

5. The process of claim 2 wherein the reaction is effected with an excess of chromyl chloride.

6. The process of claim 5 wherein the reaction is effected at —10° C. to 10° C. from 1 to 5 hours.

7. In a process for the production of 6-chloro-3-keto-$\Delta^{4,6}$- steroids selected from the group consisting of the androstane and pregnane series the step comprising reacting the corresponding 3-keto-$\Delta^{4,6}$-steroid with 1.5 to 10 mols of chromyl chloride.

8. The process of claim 1 wherein 2 to 5 mols of chromyl chloride are employed.

9. A process for the production of 17α-acetoxy-6-chloro-$\Delta^{4,6}$-pregnadiene-3,20-dione comprising reacting 17α-acetoxy-$\Delta^{4,6}$-pregnadiene-3,20-dione with chromyl chloride and thereafter dehydrating the thus formed 17α- acetoxy - 6β - chloro-7α-hydroxy-Δ⁴-pregnene-3,20-dione with an acid selected from the group consisting of hydrochloric acid and hydrobromic acid.

10. In a process for the production of 17α-acetoxy-6-chloro-Δ⁴,⁶-pregnadiene-3,20-dione the step comprising reacting 17α-acetoxy-Δ⁴,⁶-pregnadiene-3,20-dione at 0° C. in an inert solvent with 5 molar equivalents of chromyl chloride.

No references cited.

UNITED STATES PATENT OFFICE
CERTIFICATE OF CORRECTION

Patent No. 3,076,823            February 5, 1963

Howard J. Ringold et al.

It is hereby certified that error appears in the above numbered patent requiring correction and that the said Letters Patent should read as corrected below.

Column 4, line 60, after "-10° C. to 10° C." insert --, for a period of time of 1 to 5 hours. --.

Signed and sealed this 20th day of August 1963.

(SEAL)
Attest:

ERNEST W. SWIDER
Attesting Officer

DAVID L. LADD
Commissioner of Patents